United States Patent
Nikolayev et al.

(10) Patent No.: US 9,258,260 B2
(45) Date of Patent: Feb. 9, 2016

(54) FILTERING ELECTRONIC MESSAGES BASED ON DOMAIN ATTRIBUTES WITHOUT REPUTATION

(71) Applicant: C/O Microsoft Technology Licensing, LLC, Redmond, WA (US)

(72) Inventors: Alexander Nikolayev, Kirkland, WA (US); Weisheng Li, Bothell, WA (US); Mauktik Gandhi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 13/970,484

(22) Filed: Aug. 19, 2013

(65) Prior Publication Data

US 2015/0052207 A1    Feb. 19, 2015

(51) Int. Cl.
*H04L 12/58*    (2006.01)

(52) U.S. Cl.
CPC ...................................... *H04L 51/12* (2013.01)

(58) Field of Classification Search
CPC .... G06Q 10/107; H04L 12/585; H04L 12/58; H04L 12/581
USPC ......................................................... 709/206
See application file for complete search history.

(56) References Cited

U.S. PATENT DOCUMENTS

| | | | |
|---|---|---|---|
| 7,206,814 B2 | 4/2007 | Kirsch | |
| 7,665,131 B2 | 2/2010 | Goodman et al. | |
| 7,711,779 B2 | 5/2010 | Goodman et al. | |
| 2005/0015626 A1 | 1/2005 | Chasin | |
| 2005/0076240 A1* | 4/2005 | Appleman | 713/201 |
| 2006/0026242 A1 | 2/2006 | Kuhlmann et al. | |
| 2006/0149821 A1 | 7/2006 | Rajan et al. | |
| 2008/0104180 A1 | 5/2008 | Gabe | |
| 2009/0254989 A1 | 10/2009 | Achan et al. | |
| 2010/0070448 A1* | 3/2010 | Omoigui | 706/47 |
| 2010/0077043 A1 | 3/2010 | Ramarao et al. | |
| 2012/0216040 A1 | 8/2012 | Tanamy et al. | |

OTHER PUBLICATIONS

Ramachandran, et al., "Filtering Spam with Behavioral Blacklisting", Retrieved at <<http://delivery.acm.org/10.1145/1320000/1315288/p342-ramachandran.pdf?ip=203.8.109.15&acc=ACTIVE%20SERVICE&key=C2716FEBFA981EF1193B1DAAE4F8BDAFA31CC7C692744019&CFID=222825923&CFTOKEN=40942684&_acm_=1370503212_4a44f865fc49ee4407f307af53445c5f>>, In Proceedings of the 14th ACM Conference on Computer and Communications Security, Oct. 29, 2007, pp. 10.

Antonakakis, et al., "Building a Dynamic Reputation System for DNS", Retrieved at <<http://static.usenix.org/event/sec10/tech/full_papers/Antonakakis.pdf>>, In Proceedings of the 19th USENIX Security Symposium, Aug. 11, 2010, pp. 17.

"International Search Report and Written Opinion Issued in PCT Patent Application No. PCT/US2014/051395", Mailed Date: Apr. 8, 2015, 8 Pages.

* cited by examiner

*Primary Examiner* — Vivek Srivastava
*Assistant Examiner* — Sibte Bukhari
(74) *Attorney, Agent, or Firm* — Damon Rieth; Jim Ross; Micky Minhas

(57) ABSTRACT

A messaging application filters electronic messages based on domain attributes without a reputation. A message with a uniform resource identifier (URI) is received and determined to not be included within a trusted or a block list. A total score is computed from weighted scores assigned to factors associated with the message. The message is evaluated for an unsolicited message determination by comparing the total score against a predetermined threshold.

19 Claims, 6 Drawing Sheets

FILTERING ELECTRONIC MESSAGES BASED ON DOMAIN ATTRIBUTES WITHOUT REPUTATION

BACKGROUND

In a networked environment, email may be routed from a sending client over the network to one or more destination recipient mailbox servers. Conventional email routing involves routing an email message through mail transport agents or servers using simple mail transfer protocol (SMTP). Typically, when an email message passes through a mail transport agent, data associated with the email message may be only briefly stored on the mail transport agent for a period long enough to receive the email message from the sender and to send the email message to the next server on the email transmission route.

Email applications are widely used by users on a variety of client devices for non-real time correspondence. With the proliferation of computing and networking technologies, email use has become an inextricable part of daily personal and professional lives. The increased reliance on email brings with it the disadvantage of how to deal with increasingly large numbers of emails. It is a common occurrence to receive and transmit massive amounts of email through limited resources such as mail transport agents.

Typically, a substantial portion of email transmitted and received is unsolicited email (also known as spam). Legacy anti-unsolicited email protection technologies rely on existing knowledge of messaging factors such as sender, recipient, sender domain, IP address, and associated reputation. Reputation has a high value role in making a determination about a message being an unsolicited email. If reputation for message factors is not available, unsolicited email determination becomes a significant obstacle for protection technologies.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to filtering electronic messages based on domain attributes without a reputation. According to some embodiments, a messaging application may receive a message with a uniform resource identifier (URI). The message may be an email. The URI may be determined not to be included within a trusted or a block list. The URI may be determined to be without a reputation.

Next, weighted scores may be assigned to factors associated with the message. The factors may include statistics about the URI, a sender, a geo-location of the sender, a size of the message, a recipient, a recipient count, a recipient domain, a recipient domain count, number of additional messages having the URI, and similar ones. A total score may be computed from the weighted scores. Furthermore, the message may be evaluated for an unsolicited message determination by comparing the total score against a predetermined threshold.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
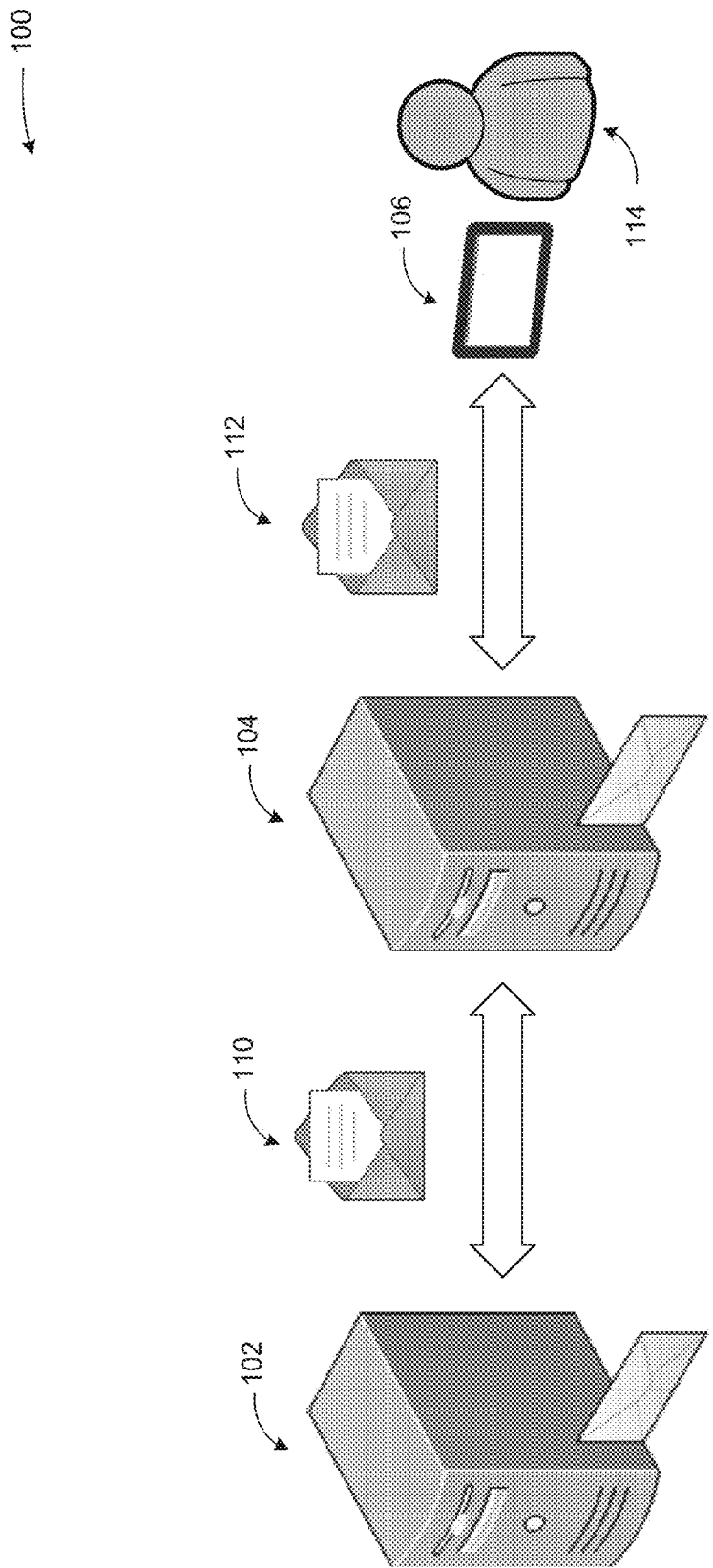
FIG. 1 illustrates an example concept diagram of filtering electronic messages based on domain attributes without a reputation according to some embodiments.

As briefly described above, a messaging application may filter electronic messages based on domain attributes without a reputation. The messaging application may receive a message with a uniform resource identifier (URI). The URI may be determined not to be included within a trusted or a block list. A total score may be computed from weighted scores of factors associated with the message. And, the message may be evaluated for an unsolicited message determination by comparing the total score against a predetermined threshold.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for filtering electronic messages based on domain attributes without a reputation. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example concept diagram of filtering electronic messages based on domain attributes without a reputation according to some embodiments. The components and environments shown in diagram 100 are for illustration purposes. Embodiments may be implemented in various local, networked, cloud-based and similar computing environments employing a variety of computing devices and systems, hardware and software.

A local message server 104 may receive an electronic message 110 such as an email from an external message server 102. The local message server 104 may be executing a messaging application managing incoming and outgoing messages. The message 110 may be evaluated for an unsolicited message determination (also known as spam). The messaging application may filter the message 110. The message 110 may be determined to include a URI. The URI may be determined to be without a reputation. A reputation identifies the URI with a classification such as a trusted source or an untrusted source.

The local message server 104 may label the message 110 as an unsolicited message in response to evaluating scored factors associated with the message against a predetermined threshold. Alternatively, a filtered message 112 may be forwarded to a client device 106 in response to determining the message 110 not to be an unsolicited message. The filtered message 112 may be displayed in a client device 106 by a client messaging application or a client instance of the messaging application executing in the local message server 104. The client device may display the filtered message 112 to a user 114.

The client device 106 may include a tablet device, a desktop computer, a laptop computer, a smart phone, and similar ones. The client device 106 may accept a variety of input to enable the user 114 to interact with the filtered message 112 including, but not exclusive to, touch based, gesture based, keyboard, mouse, audio, video, eye-tracking, and similar input.

Figure 2:
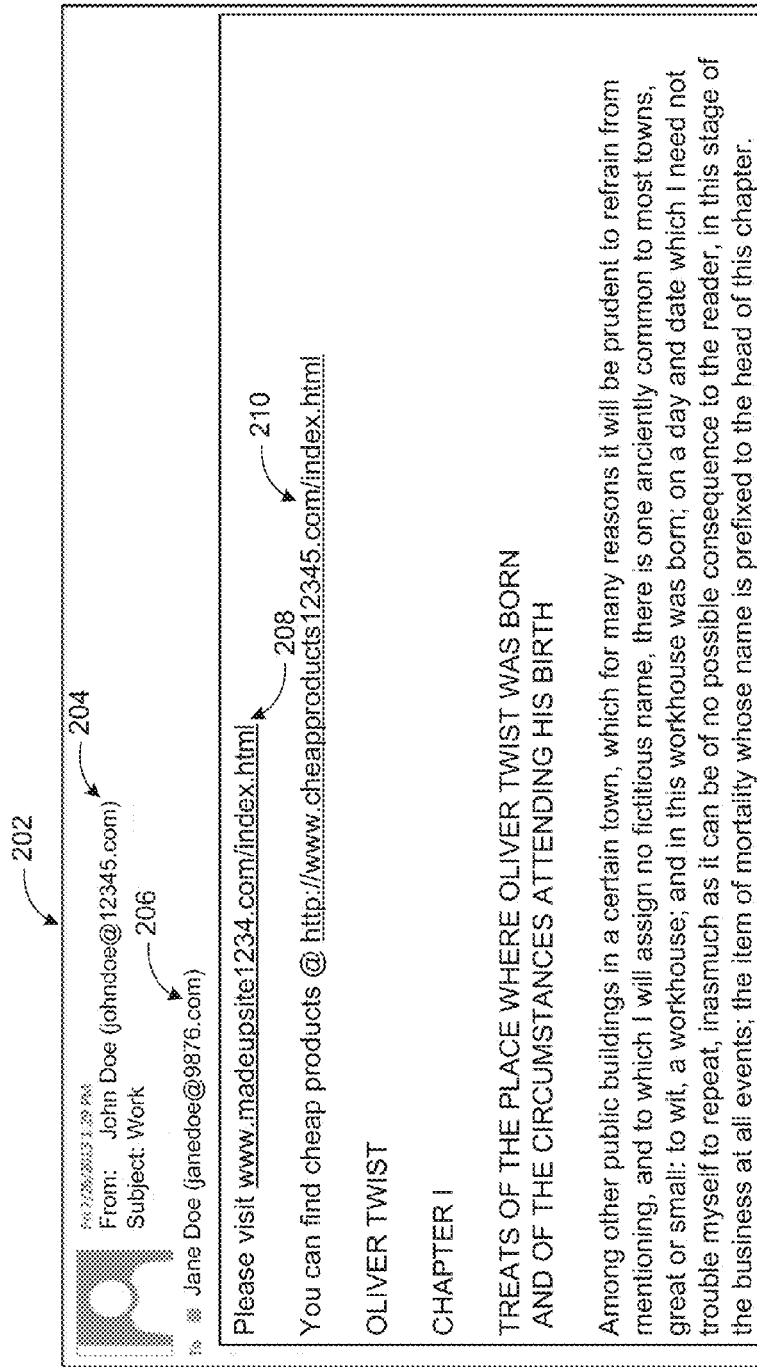
FIG. 2 illustrates an example message with uniform resource identifiers (URI) without reputations according to embodiments.

FIG. 2 illustrates an example message with URIs without reputations according to embodiments. Diagram 200 displays a message 202 including a first URI 208 and a second URI 210.

The message 202 may be an email. The message 202 may have attributes including sender 204 and recipient 206. The message may also include the first URI 208 and the second URI 210. The first URI 208 and the second URI 210 may be determined to be without reputations.

The messaging application may evaluate the message for an unsolicited message determination in response to detecting the first URI 208 and/or the second URI 210 without a reputation. Lack of reputation may indicate an inability to locate a domain of the first URI 208 and the second URI 210 within a trusted or a block list. A trusted list may provide a list of trusted domains. A block list may provide a list of untrusted domains. In addition, the trusted list or the block list may be retrieved from a local resource. Alternatively, the trusted or the block list may be retrieved from a trusted external resource.

Figure 3:
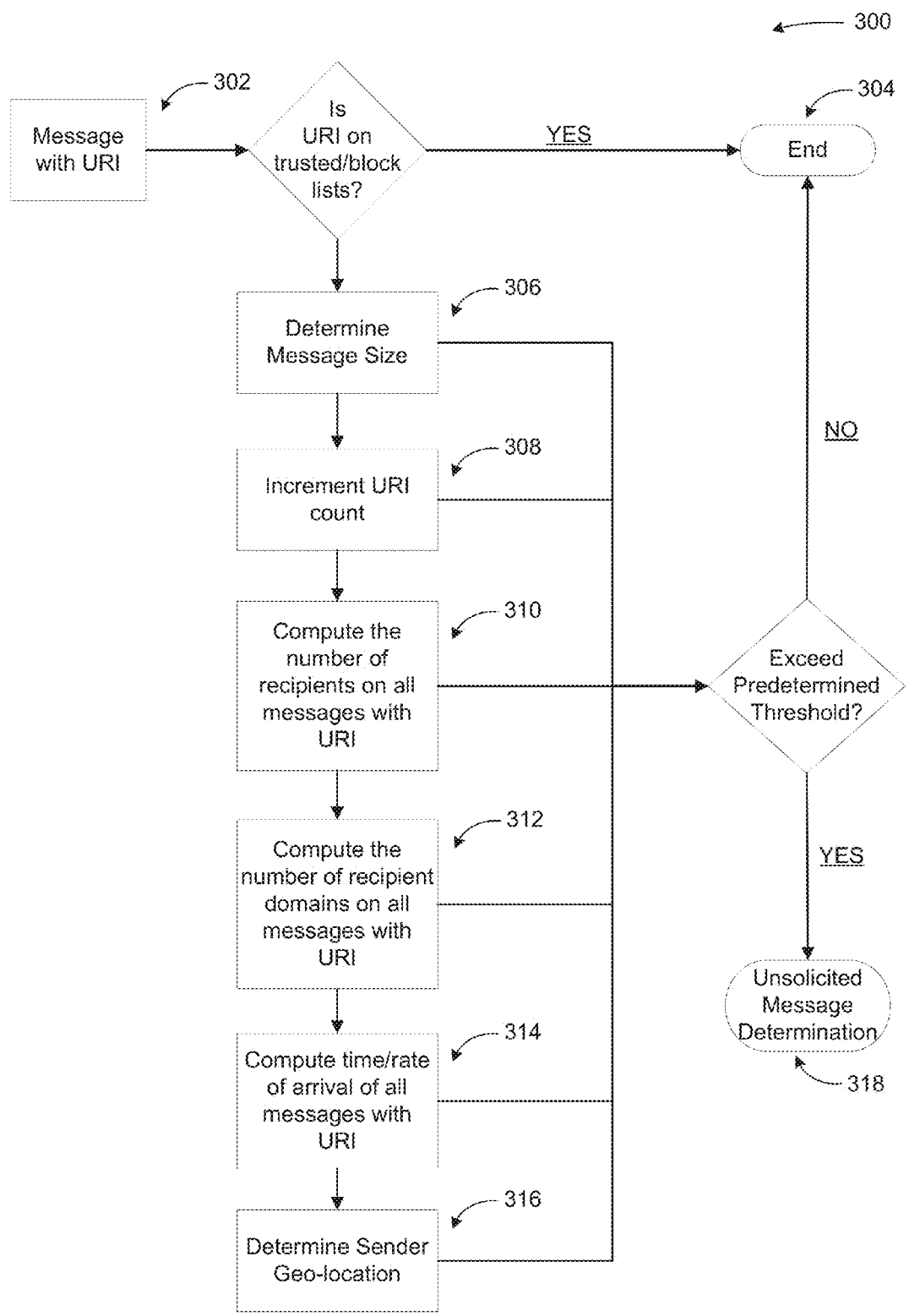
FIG. 3 illustrates an example sequence diagram summarizing message filtering based on domain attributes without a reputation according to embodiments.

FIG. 3 illustrates an example sequence diagram summarizing message filtering based on domain attributes without a reputation according to embodiments. Diagram 300 displays scoring of factors associated with a message and evaluating the factors against a predetermined threshold.

The message application may detect a message 302 with a URI. A reputation of the URI may be determined by locating the URI on a trusted or a block list. A negative reputation may be confirmed by locating the URI within a block list. A positive reputation may be confirmed by locating the URI within a trusted list. A positive or a negative reputation determination may end 304 the process of evaluating the message 302.

Processes associated with additional filtering may be executed in response to not locating the URI within a trusted or a block list. The messaging application may determine factors including a message size 306 of the message. The message size may be assigned a first weighted score. Next a URI count 308 may be incremented. The URI count may be a number associated with number of URI without reputations located within the message. The incremented URI count may be assigned a second weighted score.

In addition, the messaging application may determine a set of messages sent to other recipients within a predefined group having the URI. The set of messages may include the message with the URI that was initially received. The set of message may also include additional messages with matching URIs. A number of recipients 310 of the set of messages may be computed. The number of recipients may be assigned a third weighted score. Furthermore, the number of recipient domains 312 may be computed for the set of messages. The number of recipient domains may be assigned a fourth weighted score.

Moreover, a time and/or a rate of arrival 314 of the set of messages with the URI may be computed. The time and/or the rate of arrival may be assigned a fifth weighted score. The geo-location 316 of the sender may also be determined for the message. The geo-location may also be assigned a sixth weighted score. The first, second, third, fourth, fifth, and/or the sixth weighted scores may be added to determine a total score for the message. The total score may be evaluated against a predetermined threshold to make an unsolicited message determination 318. In response to the total score exceeding the predetermined threshold, the unsolicited message determination of the message may be confirmed. In response to the total score remaining within the predetermined threshold, the unsolicited message determination of the message may be rejected.

The predetermined threshold and/or weighted scores may be dynamically adjusted based on unsolicited message activity, recipient(s), and similar ones. Assigning weighted scores may also be adjusted over time based on accumulated data and statistics associated with the factors. In an example scenario a machine-learning algorithm may be used to adjust weighted scores over time using the accumulated data and statistics associated with factors.

Example of factors to determine weighted scores associated with an unsolicited message determination are not provided in a limiting sense. Other factors associated with the message, the URI, or additional messages sharing similar attributes may be utilized to determine weighted scores. The weighted scores may be added to a total score for comparison against a predetermined threshold.

The example scenarios and schemas in FIG. 2 through 3 are shown with specific components, data types, and configurations. Embodiments are not limited to systems according to these example configurations. Filtering electronic messages based on domain attributes without reputation may be implemented in configurations employing fewer or additional components in applications and user interfaces. Furthermore, the example schema and components shown in FIG. 2 through 3 and their subcomponents may be implemented in a similar manner with other values using the principles described herein.

Figure 4:
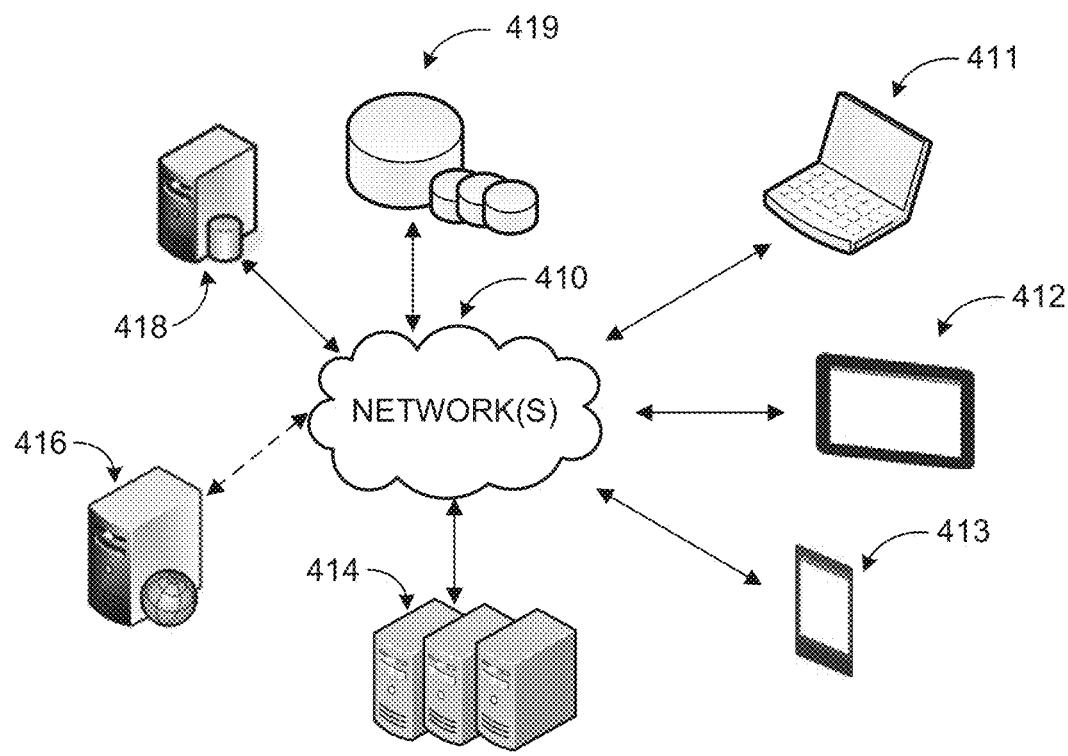
FIG. 4 is a networked environment, where a system according to embodiments may be implemented.

FIG. 4 is a networked environment, where a system according to embodiments may be implemented. Local and remote resources may be provided by one or more servers 414 or a single server (e.g. web server) 416 such as a hosted service. An application may execute on individual computing devices such as a smart phone 413, a tablet device 412, or a laptop computer 411 ('client devices') and communicate with email providers/recipients through network(s) 410.

As discussed above, a messaging application may detect a message with a URI. The URI may be determined not to be included within a trusted or a block list. A total score may be computed from weighted scores assigned to factors associated with the message. The message may be evaluated for an unsolicited message determination by comparing the total score to a predetermined threshold. Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to filter electronic messages based on domain attributes without a reputation. Furthermore, the networked environments discussed in FIG. 4 are for illustration purposes only. Embodiments are not limited to the example applications, modules, or processes.

Figure 5:
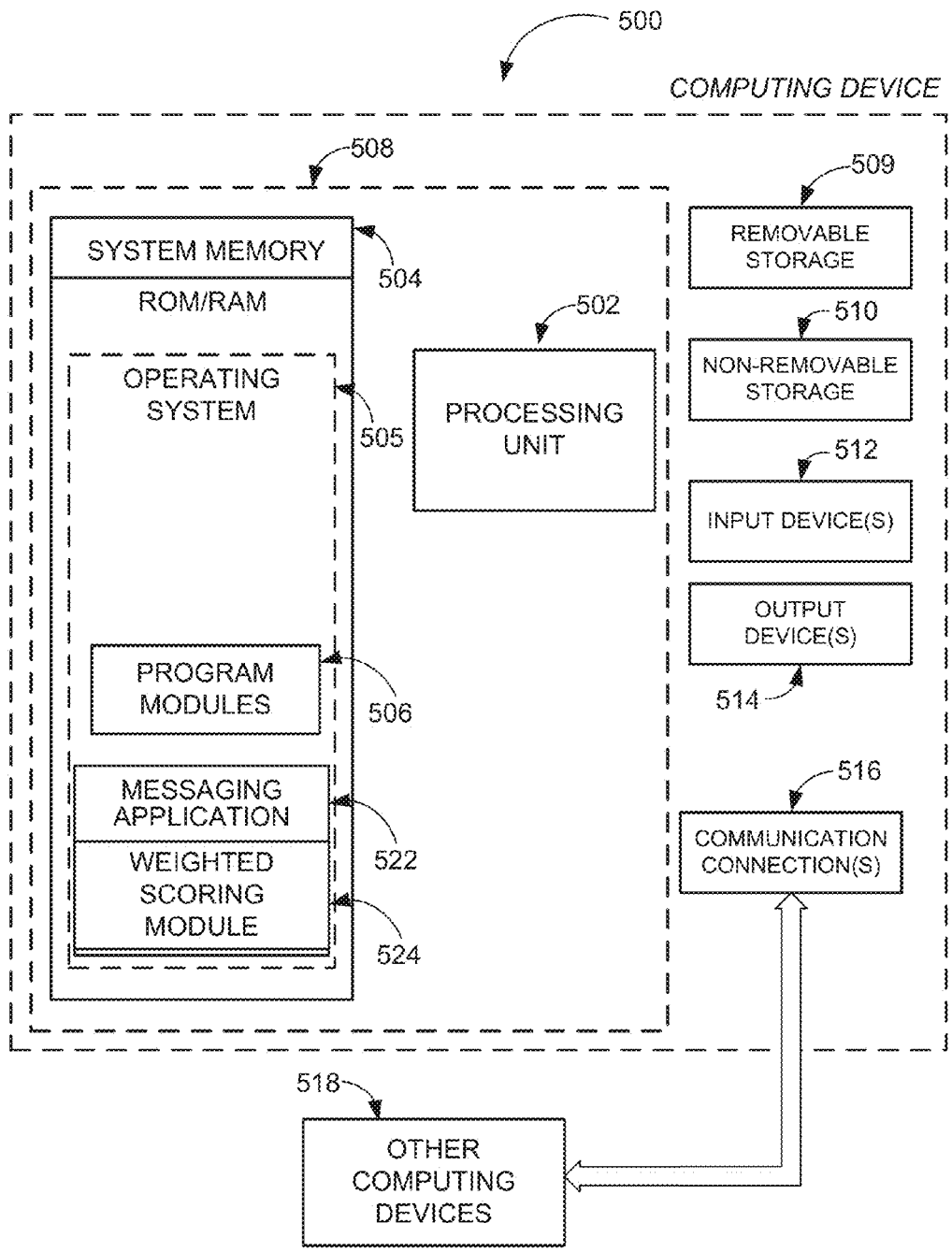
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® and WINDOWS PHONE® operating systems from MICROSOFT CORPORATION of Redmond, Wash. The system memory 504 may also include one or more software applications such as program modules 506, a messaging application 522, and a weighted scoring module 524.

A messaging application 522 may receive a message with a URI. The messaging application 522 may determine the URI not to be included within a trusted list or a block list. The weighted scoring module 524 may assign weighted scores to factors associated with the message. The messaging application 522 may evaluate the message for an unsolicited message determination by comparing the total score computed from the weighted scores against a predetermined threshold. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
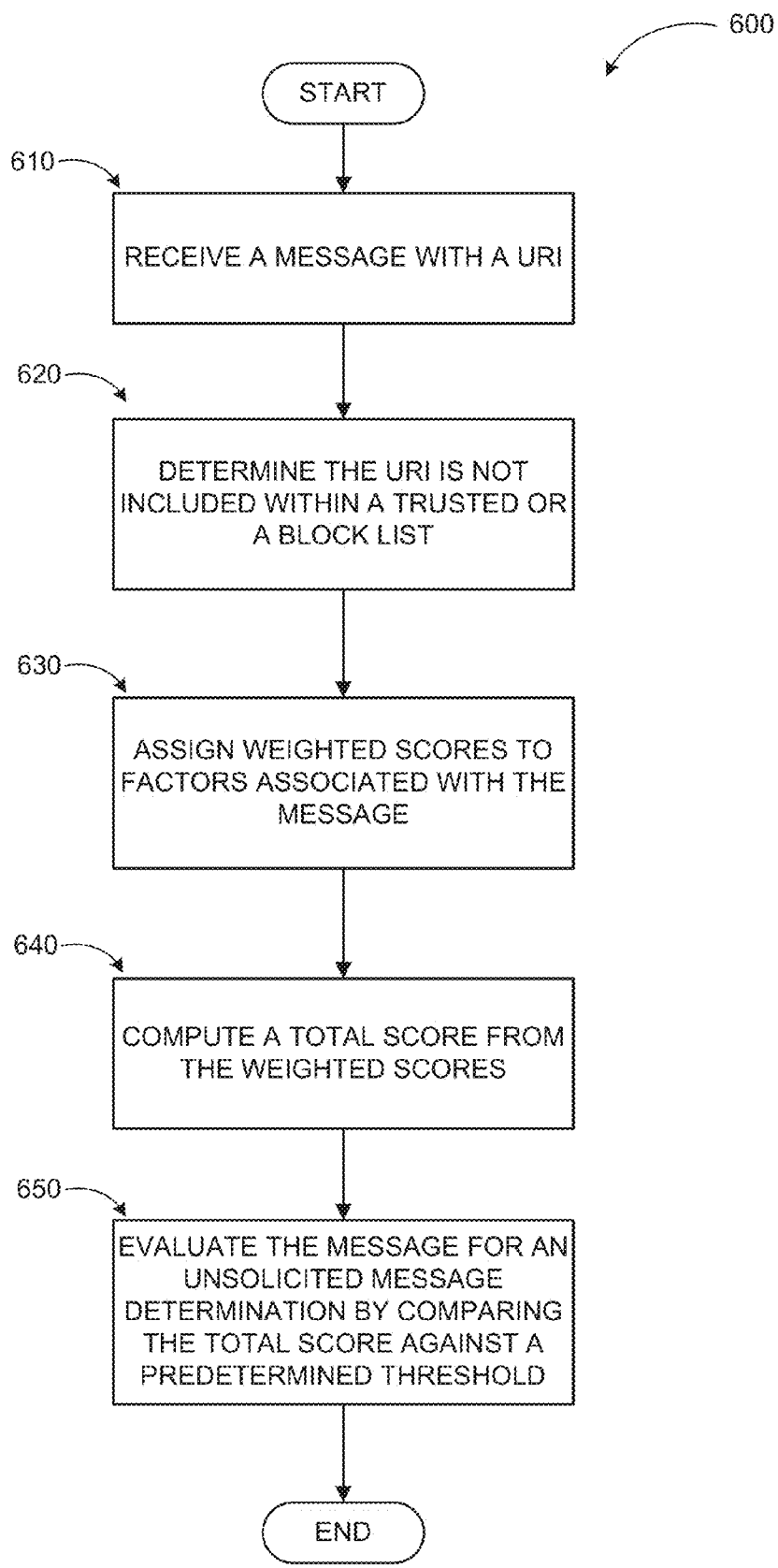
FIG. 6 illustrates a logic flow diagram for a process filtering electronic messages based on domain attributes without a reputation according to embodiments.

FIG. 6 illustrates a logic flow diagram for a process filtering electronic messaged based on domain attributes without a reputation according to embodiments. Process 600 may be implemented by a messaging application in some examples.

Process 600 may begin with operation 610 where the messaging application may receive a message with a URI. At operation 620, the URI may be determined not to be included within a trusted or block list. The trusted or block list may be retrieved from a local resource or from a trusted resource.

Factors associated with the message may be assigned weighted scores at operation 630. The factors may include attributes associated with the message, the URI, and additional messages having the URI. A total score may be computed from the weighted scores at operation 640. The weighted scores may be added to calculate the total score. Next, the message may be evaluated for an unsolicited message determination by comparing the total score against a predetermined threshold, at operation 650.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 are for illustration purposes. Filtering electronic messages based on domain attributes without a reputation, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for filtering an electronic message based on domain attributes, the method comprising:
receiving the electronic message with a uniform resource identifier (URI);
determining that the URI is not included within at least one of: a trusted list and a block list, wherein the trusted list provides a list of trusted domains and the block list provides a list of untrusted domains;
indicating a failure to locate a reputation of the URI in one or more of the trusted domains and the untrusted domains;
assigning weighted scores to one or more factors associated with the electronic message;
computing a total score from the weighted scores; and
evaluating the electronic message to determine an unsolicited electronic message by comparing the total score against a predetermined threshold.

2. The method of claim 1, further comprising:
retrieving the trusted list and the block list from one of: a local resource and a trusted external resource.

3. The method of claim 1, further comprising:
determining a size of the electronic message; and
assigning a first weighted score to the size.

4. The method of claim 3, further comprising:
incrementing a URI count; and
assigning a second weighted score to the URI count.

5. The method of claim 4, further comprising:
determining a set of electronic messages sent to other recipients within a predefined group having the URI.

6. The method of claim 5, further comprising:
computing a number of recipients of the set of electronic messages; and
assigning a third weighted score to the number of recipients.

7. The method of claim 6, further comprising:
computing a number of recipient domains for the set of electronic messages; and
assigning a fourth weighted score to the number of recipient domains.

8. The method of claim 7, further comprising:
computing at least one of: a time of arrival and a rate of arrival of the set of electronic messages; and
assigning a fifth weighted score to the at least one of: the time of arrival and the rate of arrival of the set of electronic messages.

9. The method of claim 8, further comprising:
determining a geo-location of a sender of the electronic message; and
assigning a sixth weighted score to the geo-location.

10. The method of claim 9, further comprising:
adding two or more of the first weighted score, the second weighted score, the third weighted score, the fourth weighted score, the fifth weighted score, and the sixth weighted score to determine a total score.

11. A computing device for filtering an electronic message based on domain attributes, the computing device comprising:
a memory configured to store instructions; and
a processor coupled to the memory, the processor executing a messaging application in conjunction with the instructions stored in the memory, wherein the messaging application is configured to:
receive the electronic message with a uniform resource identifier (URI);
retrieve a trusted list and a block list from one of: a local resource and a trusted external resource;
determine that the URI is not included within at least one of: the trusted list and the block list, wherein the trusted list provides a list of trusted domains and the block list provides a list of untrusted domains;
indicate a failure to locate a reputation of the URI in one or more of the trusted domains and the untrusted domains;

assign weighted scores to one or more factors associated with the electronic message;

compute a total score from the weighted scores; and evaluate the electronic message to determine an unsolicited electronic message by comparing the total score against a predetermined threshold.

12. The computing device of claim 11, wherein the messaging application is further configured to:

confirm a determination of the unsolicited electronic message in response to the total score exceeding the predetermined threshold.

13. The computing device of claim 11, wherein the messaging application is further configured to:

reject a determination of the unsolicited electronic message in response to the total score remaining within the predetermined threshold.

14. The computing device of claim 11, wherein the messaging application is further configured to:

adjust the predetermined threshold and the weighted scores based on at least one of: a current unsolicited message activity and a recipient of the electronic message.

15. The computing device of claim 11, wherein the messaging application is further configured to:

adjust the weighted scores over time based on at least one of: accumulated data and statistics associated with the one or more factors.

16. The computing device of claim 15, wherein the messaging application is further configured to:

employ a machine-learning algorithm to adjust the weighted scores.

17. A method executed on a computing device for filtering an electronic message based on domain attributes, the method comprising:

receiving the electronic message with a uniform resource identifier (URI);

retrieving a trusted list and a block list from one of: a local resource and a trusted external resource;

determining that the URI is not included within at least one of: the trusted list and the block list, wherein the trusted list provides a list of trusted domains and the block list provides a list of untrusted domains;

indicating a failure to locate a reputation of the URI in one or more of the trusted domains and the untrusted domains;

assigning weighted scores to one or more factors associated with the electronic message;

computing a total score from the weighted scores;

evaluating the electronic message to determine an unsolicited electronic message by comparing the total score against a predetermined threshold; and adjusting the predetermined threshold and the weighted scores based on at least one of: a current unsolicited message activity and a recipient of the electronic message.

18. The method of claim 17, further comprising:

confirming a determination of the unsolicited electronic message in response to the total score exceeding the predetermined threshold; and rejecting the determination of the unsolicited electronic message in response to the total score remaining within the predetermined threshold.

19. The method of claim 18, further comprising:

adjusting the weighted scores over time based on at least one of: accumulated data and statistics associated with the factors; and using a machine-learning algorithm to adjust the weighted scores.

* * * * *